United States Patent

Ahmed

(10) Patent No.: US 9,684,065 B2
(45) Date of Patent: Jun. 20, 2017

(54) METHOD AND DEVICE FOR DETECTING STRUCTURES IN AN OBJECT UNDER INVESTIGATION

(71) Applicant: ROHDE & SCHWARZ GMBH & CO. KG, Munich (DE)

(72) Inventor: Sherif Ahmed, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 279 days.

(21) Appl. No.: 14/388,727

(22) PCT Filed: Mar. 28, 2013

(86) PCT No.: PCT/EP2013/056695
§ 371 (c)(1),
(2) Date: Sep. 26, 2014

(87) PCT Pub. No.: WO2013/144290
PCT Pub. Date: Oct. 3, 2013

(65) Prior Publication Data
US 2015/0054679 A1 Feb. 26, 2015

(30) Foreign Application Priority Data

Mar. 29, 2012 (DE) .................. 10 2012 205 070
Apr. 30, 2012 (DE) .................. 10 2012 207 186

(51) Int. Cl.
*G01S 13/89* (2006.01)
*G01S 7/41* (2006.01)
(Continued)

(52) U.S. Cl.
CPC ............ *G01S 7/41* (2013.01); *G01S 7/411* (2013.01); *G01S 13/887* (2013.01); *G01S 13/89* (2013.01); *G01S 13/90* (2013.01)

(58) Field of Classification Search
CPC . G01S 7/41; G01S 13/90; G01S 7/411; G01S 13/887; G01S 13/89
(Continued)

(56) References Cited

U.S. PATENT DOCUMENTS 4,546,354 A * 10/1985 Boles .................. G01S 13/66
342/179
4,546,355 A * 10/1985 Boles .................. G01S 13/66
342/179
(Continued)

FOREIGN PATENT DOCUMENTS

DE        103 46 816 A1    5/2005
DE    10 2006 032735 A1    1/2008
JP       2007-232734 A      9/2007

OTHER PUBLICATIONS

Notification of Transmittal of Translation of the International Preliminary Report on Patentability; International Preliminary Report on Patentability; Written Opinion of the International Searching Authority for corresponding International Application No. PCT/EP2013/056695, dated Oct. 9, 2014, 12 pages.

(Continued)

Primary Examiner — John B Sotomayor
(74) Attorney, Agent, or Firm — Ditthavong & Steiner, P.C.

(57) ABSTRACT

A method for detecting structures (41, 42) such as edges and material transitions on and/or in an object (40) under investigation has an antenna arrangement which transmits microwave signals and registers the signals reflected from the object (40) under investigation in magnitude and phase. A three-dimensional image of the object (40) under investigation is reconstructed at sampling points of the object under investigation from the latter. It operates with the method steps:

determination of a spatial position of a structure (41, 42) from the magnitude of the reflected signal, (Continued)

determination of the sign of the reflection coefficient of the reflected signal at the spatial position of the structure (41, 42), and identification of structures (41, 42) on the basis of the spatial arrangement of the sign of the reflection coefficient.

20 Claims, 3 Drawing Sheets

(51) Int. Cl.
  *G01S 13/88* (2006.01)
  *G01S 13/90* (2006.01)

(58) Field of Classification Search
  USPC .................................. 342/25 A–25 F, 25 R
  See application file for complete search history.

(56) References Cited

U.S. PATENT DOCUMENTS

| | | | |
|---|---|---|---|
| 5,943,006 A * | 8/1999 | Crane | G01S 7/288 342/196 |
| 6,255,987 B1 * | 7/2001 | Lancashire | H04N 19/98 342/194 |
| 6,573,855 B1 | 6/2003 | Hayakawa et al. | |
| 6,911,932 B1 * | 6/2005 | Martinez | G01S 13/9023 342/118 |
| 7,259,716 B1 * | 8/2007 | Dubbert | G01S 7/28 342/131 |
| 7,646,327 B1 * | 1/2010 | Freeman | G01S 13/9029 342/162 |
| 2006/0061505 A1 * | 3/2006 | Kinghorn | G01S 13/282 342/25 A |
| 2006/0087471 A1 | 4/2006 | Hintz | |
| 2006/0164288 A1 * | 7/2006 | Voelker | G01S 7/40 342/25 A |
| 2008/0224923 A1 * | 9/2008 | Aprile | G01S 13/9029 342/25 D |
| 2012/0019410 A1 * | 1/2012 | Ferretti | G01S 13/9023 342/25 C |

OTHER PUBLICATIONS

Chan et al., "Imaging With Terahertz Radiation," Reports on Progress in Physics, Institute of Physics Publishing, vol. 70, No. 8, Aug. 1, 2007, pp. 1325-1379.

International Search Report for corresponding International Application No. PCT/EP2013/056695, dated Jun. 21, 2013, 3 pages.

Maierhofer, "Radaranwendungen Im Bauwesen," Fachbeitrage, ZfP-Zeltung 72, dated Dec. 2000, 8 pages.

\* cited by examiner

METHOD AND DEVICE FOR DETECTING STRUCTURES IN AN OBJECT UNDER INVESTIGATION

CROSS-REFERENCE TO RELATED APPLICATION

The present application is a national phase application of PCT Application No. PCT/EP2013/056695, filed Mar. 28, 2013, and claims priority to German Application No. DE 10 2012 205 070.1, filed on Mar. 29, 2012, and German Application No. DE 10 2012 207 186.5, filed on Apr. 30, 2012, the entire contents of which are herein incorporated by reference.

BACKGROUND OF THE INVENTION

Field of the Invention

The invention, according to the various embodiments described herein, relates to a method and a device for detecting structures, such as edges and material transitions on and/or in an object under investigation, comprising an antenna array with synthetic focusing.

Discussion of the Background

Active imaging-antenna arrangements in the millimeter and microwave range have gained increasing importance through the versatility of their potential applications in the fields of medicine and industry. Such antenna arrangements comprise a plurality of individual transmission and reception antennas, whereas each antenna transmits a signal in succession, and the signal reflected from the object is received by all of the reception antennas. This is implemented either at a single frequency or stepwise at different frequencies. In this context, both the magnitude and also the phase of the received signal are registered. Using a digital beamforming algorithm (digital beamforming), it is possible to calculate back from the registered signals to the corresponding object points which have reflected the received signals and to prepare a three-dimensional image of the entire body in this manner.

Such an antenna arrangement is described, for example, in DE 10 2009 040 450 A1. The antenna arrangement described here is for the detection of concealed dielectric objects. Accordingly, the transmitted microwave signal is almost totally reflected from the human body because of its high water content and associated high permittivity. By contrast, a dielectric object arranged on the body reflects only a part of the signal from the front side of the object because of its relatively lower permittivity; another part of the signal is reflected from the rear side of the object at the limiting surface with the human body. From the interference of the two partially reflected microwave signals, it is possible to infer the presence of a dielectric region and accordingly to distinguish and visualize the dielectric object by contrast with the human body.

In this context, it is often difficult to distinguish the edge of the object from structures which arise as a result of the illumination boundary of the object. Furthermore, it is also desirable to be able to investigate the internal structure of a dielectric body, for example, with regard to influences or layers made from another material. This is particularly relevant for material investigation.

SUMMARY OF THE INVENTION

Embodiments of a method and a device which allows structures, such as material transitions and edges in and/or on a dielectric material to be determined in a non-destructive and spatially resolved manner are provided.

In the method according to one embodiment of the invention for detecting structures such as edges and material transitions on and/or in an object under investigation, the object under investigation is scanned in three dimensions with an antenna array. Accordingly, microwave signals are transmitted, and the signals reflected from the object under investigation are registered in magnitude and phase. A spatial position of a structure is determined from the magnitude of the reflected signal, following this, the sign of the reflection coefficient of the reflected signal at the previously determined spatial position is determined and, on the basis of the spatial arrangement of the sign of the reflection coefficient, the detected structure is identified.

Accordingly, dielectric objects can be investigated in a non-destructive manner with regard to inclusions or material transitions, and similarly, edges of a dielectric body or a dielectric layer on a strongly reflecting body can be distinguished from imaging artefacts which are caused by the shadows or other illumination boundaries.

For this purpose, the reflection behavior of electromagnetic signals at limiting layers between materials with different permittivity is exploited. By contrast with transmitted signals, the sign of the reflection coefficient switches if the signal is reflected at a limiting layer between a material with a relatively lower permittivity and a material with a relatively higher permittivity. Conversely, the sign of the reflection coefficient remains unchanged if the signal is reflected at the transition between a material with a relatively higher permittivity and a material with a relatively lower permittivity. In physical terms, a negative reflection coefficient means that the signal experiences a sudden phase change of 180° at the reflection position.

Material transitions can be identified through a targeted searching of the object under investigation, for example, for coherent regions with identical phase behavior or respectively identical sign of the reflection coefficient. Since the object under investigation can be scanned in three-dimensions from the reflected signals, for example, using a synthetic focusing method, even structures in the interior of the object under investigation can be detected.

Accordingly, it is advantageous if the exact position of the structure is determined by preparing an additional image of the environment of the determined spatial position with a narrower grid of sampling points. Accordingly, the object under investigation can be investigated with a relatively higher resolution in the region of a structure.

It is also advantageous if the exact spatial position of the structure is determined by interpolation of the signal magnitude between sampling points. With one embodiment of this method, the localization of the limiting layer can be improved without needing to use a numerically complicated method to refine the sampling grid. Such a local search of the actual material transition is necessary, because a structure often does not coincide exactly with a sampling point.

In an advantageous manner, the sign of the reflection coefficient is determined from the phase behavior of the reflected signal, whereas a negative sign of the reflection coefficient is present if a sudden phase change is determined in the reflected signal, and a positive sign of the reflection coefficient is present if no sudden phase change is determined in the reflected signal which is reflected from the precise spatial position of the structure. With this type of determination of the sign of the reflection coefficient, it is not necessary to calculate the reflection coefficient itself. It is sufficient to investigate the phase behavior of the reflected signal.

It is advantageous if the phase of the reflected signal at the exact position of the structure is less than −90° or more than +90° when a sudden phase change is detected, and if the phase of the reflected signal at the position of the structure is less than +90° and more than −90° when no sudden phase change is detected. In a real system with fluctuating material properties and the presence of noise, the phase of the signal will not remain exactly unchanged at a material transition, nor will it perform a sudden phase change of exactly 180°, but will only be disposed close to these theoretical values. The named value range always allows a decision to be made regarding whether a sudden phase change is present or not, at the same time with a high level of agreement with the actual behavior.

If an inclusion made from a material with a permittivity which differs from the permittivity of the surrounding object under investigation is determined, it is also advantageous if a coherent region with negative reflection coefficient within the object to be determined follows an adjacent coherent region with positive reflection coefficient or vice versa. As a result of the targeted searching of regions with an identical phase behavior or respectively behavior of the sign of the reflection coefficient, limiting surfaces can therefore be identified, and coherent regions with an identical sequence of negative or positive signs of the reflection coefficient can be identified. The shape and the position of such an inclusion can be determined in this manner.

An inclusion made from a material with a relatively higher permittivity than the material of the surrounding object under investigation is advantageously determined if a region with a negative sign is initially detected, and following this, a region with a positive reflection coefficient is detected. An inclusion made from a material with a relatively lower permittivity than the material of the surrounding object under investigation is present if a region with a positive sign is initially detected, and following this, a region with a negative sign is detected. Accordingly, from the sequence of the signs of the reflection coefficient or respectively of the phase behavior of the signal, inferences can be drawn with regard to the material properties of the inclusion relative to the surrounding object.

It is also advantageous if an irregular sequence of sign changes in a spatial region is detected when an illumination boundary of the object under investigation and/or an edge in a material with high permittivity and/or conductivity is determined. Accordingly, one embodiment of the method described can be used not only for detecting inclusions, but can also be used for detecting edges in a material with high permittivity or conductivity or in order to distinguish illumination boundaries of actual structures.

The device according to one embodiment of the invention comprises an antenna array which provides a plurality of transmission and reception antennas, whereas each transmission antenna transmits microwave signals in succession, and all of the reception antennas register the signals reflected from the object under investigation in magnitude and phase. Furthermore, the device contains an evaluation unit with an imaging unit which reconstructs a three-dimensional image of the object under investigation from the registered, reflected signal. In this context, the evaluation unit further provides a localization unit which determines a spatial position of the structure from the magnitude of the reflected signal, a phase unit which determines the sign of the reflection coefficient of the reflected signal at the spatial position of the structure, and a grouping unit which identifies the structure on the basis of the spatial arrangement of the sign of the reflection coefficient. Accordingly, without mechanical destruction of the object under investigation, its internal structure and/or layers or edges at the surface of the object under investigation can be detected and displayed visually.

The localization unit is advantageously embodied in such a manner that it determines the exact spatial position of the structure by interpolating the signal magnitude between sampling points and/or by preparing a further image of the environment of the originally determined spatial position with a relatively narrower grid of sampling points. In this manner, when a structure is indicated, the adjacent region can be investigated with a relatively higher accuracy, in order to allow an unambiguous determination of the phase behavior.

The phase unit is advantageously embodied in such a manner that it determines the sign of the reflection coefficient from the phase behavior of the reflected signal, whereas a negative sign of the reflection coefficient is present if it determines a sudden phase change in the reflected signal, and a positive sign is present if it determines a steady course of the reflected signal. Accordingly, a sudden phase change is detected if the phase of the reflected signal at the position of the structure is less than −90° or more than +90°, and no sudden phase change is detected if the phase of the reflected signal is less than +90° and more than −90°. The sign of the reflection coefficient can thus be determined in a simple manner without calculating the reflection coefficient itself. This is also possible if the signal is disturbed by noise or minor material fluctuations.

It is advantageous if the grouping unit is embodied in such a manner that it identifies a spatial extension and a spatial shape of a limiting surface of a material transition through coherent regions with identical phase behavior. Accordingly, inclusions in the interior of a dielectric can be discovered, localized and identified in size and shape.

It is similarly advantageous if the grouping unit is embodied in such a manner that it determines an illumination boundary of the object under investigation and/or an edge in a material with high permittivity and/or conductivity in the object under investigation when an irregular sequence of sign changes is present in one spatial region. In particular, the outlines of a dielectric, for example, on the human skin, can therefore be identified from imaging artefacts through illumination boundaries.

BRIEF DESCRIPTION OF THE DRAWINGS

Exemplary embodiments of the method according to the invention and the device according to the invention are illustrated in greater detail in the drawings and explained by way of example on the basis of the following description.

The drawings show:

FIG. 1 shows a device 1 according to the invention for detecting structures 10 such as material transitions and edges in a dielectric object 8. The device comprises an antenna array 2 which contains a plurality of transmission/reception antennas 3, which are arranged, for example, on a flat or cylindrical curved surface. In this context, each transmission antenna transmits in succession a microwave signal 12 which is reflected from a body 9 under investigation. The reflected signal 13 is then received by all of the reception antennas, and the magnitude and phase of the reflected signal is registered. The signals used preferably provide a frequency within the range between 30 GHz and 500 GHz, by particular preference, within the range between 50 GHz and 300 GHz. In this context, the signals are focused by a synthetic focusing, for example, using a digital beamforming algorithm, so that the object 9 under investigation is observed with reference to sampling points arranged in a three-dimensional grid.

Figure 1:
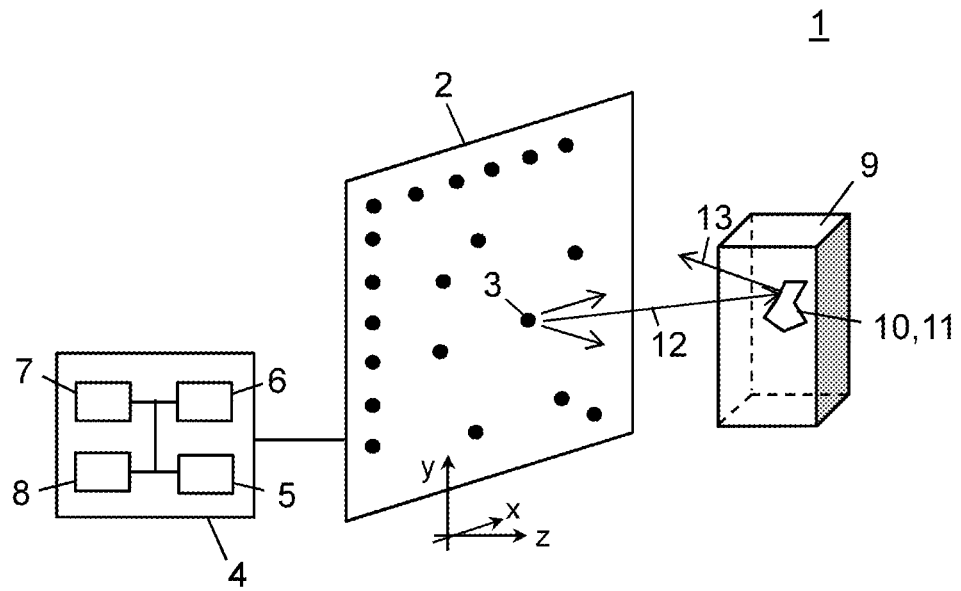
FIG. 1 a schematic view of an exemplary embodiment of a device according to the invention for detecting structures.

If the incident signal $E_I$ 12 strikes a limiting surface between two materials with a different impedance η, in the case of a transition from a material with a high impedance $\eta_1$ to a material with a relatively lower impedance $\eta_2$, the phase of the reflected signal $E_R$ 13 moves through 180°, that is to say, a sudden phase change occurs. By contrast, if the signal is reflected on the limiting surface between a material with low impedance $\eta_1$ and a material with relatively higher impedance $\eta_2$, the phase is retained. This is known through the reflection coefficient $\Gamma^b$ where $$\Gamma^b = \frac{\eta_2 - \eta_1}{\eta_2 + \eta_1} = \frac{E_R}{E_I}$$

With reference to the permittivity $\in_1$ of the material, with $$\eta_i = \sqrt{\frac{\mu_i}{\varepsilon_i}},$$

the reflection coefficient $\Gamma^b$ is obtained as:

$$\Gamma^b = A \cdot \left(\frac{1}{\varepsilon_2} - \frac{1}{\varepsilon_1}\right),$$

whereas A is a positive factor. That is, the reflection coefficient has a negative sign or respectively the reflected signal $E_R$ provides a sudden phase change, if the incident signal $E_I$ passes at a material transition from a material with $\in_1$ to a material with $\in_2$, and $\in_1 < \in_2$ applies. The reflection coefficient has a positive sign or respectively the reflected signal $E_R$ provides a steady course if the incident signal $E_I$ passes at a material transition from a material with $\in_1$ to a material with $\in_2$, and $\in_1 > \in_2$ applies.

This fact is now used for detecting structures 10, such as material inclusions 11, for detecting layers and their limits in an object under investigation, for detecting edges on materials with high permittivity, for example, water, or high conductivity, such as metals, or for detecting imaging artefacts at illumination boundaries.

For this purpose, the registered, reflected signal 13 is routed from the antenna device 2 to an evaluation unit 4. In a localization unit 6, the magnitude of the reflected signal is now determined at all of the sampling points. In this context, sampling points with a high signal magnitude indicate a limiting layer, which has reflected a signal. Since these sampling points often do not directly coincide spatially with the structure, the exact spatial position of the structure must be determined through a local search within a limited range around the originally determined sampling point.

This can be implemented either through a further image with a more strongly resolving antenna array which allows a narrower grid of sampling points, or can be achieved through an interpolation of the received signal between the sampling points. The localization unit 6 comprises the corresponding means for implementing this local search for the exact position of the structure 10. In the phase unit 7, the phase behavior of the signal 13 is now determined at the determined position of the structure 10 from the registered reflected signal 13.

In a grouping unit 8, the determined phase transitions, or respectively the equivalent sign of the reflection coefficient, are now grouped corresponding to the spatial position of the sampling points to form a three-dimensional image or also a map. Inclusions or edges can accordingly be identified from the spatial arrangement and the sequence of the determined phase transitions. An image of the object 9 under investigation with the structures 10 is prepared in an imaging unit 5.

Figure 2:
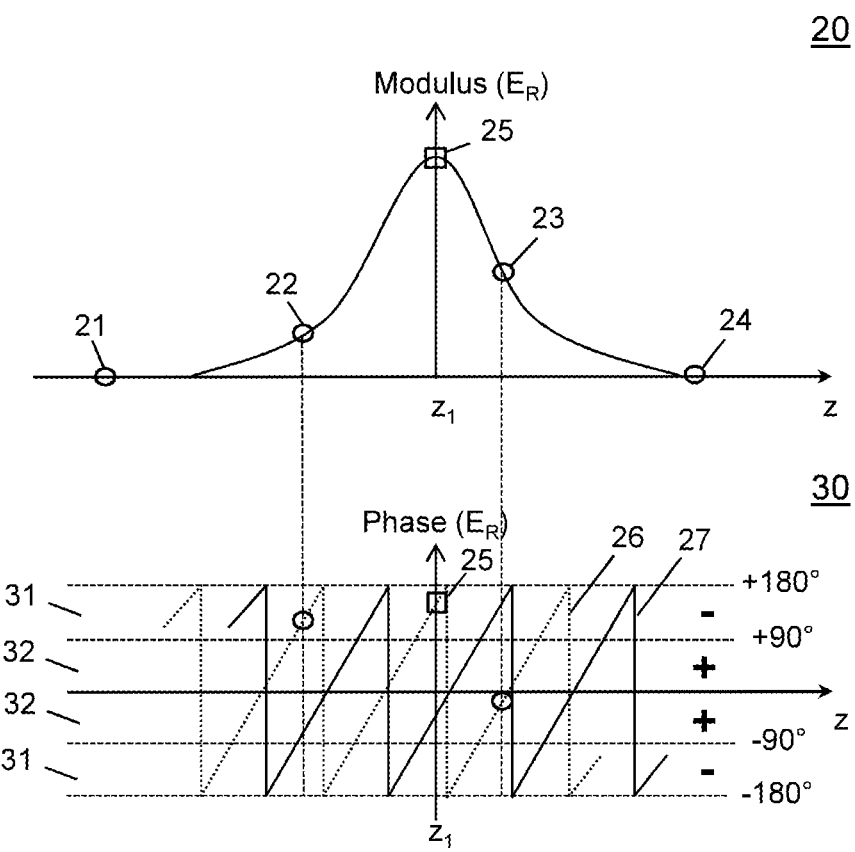
FIG. 2 a diagram for determining the position and phase behavior in a structure according to the invention.

With reference to an exemplary, reflected signal, FIG. 2 shows how the position of a structure is now investigated from the determined magnitude of the reflected signal and the determined phase. To find the exact position of the structure, the magnitude of the reflected signal is determined at the sampling points 21, 22, 23, 24. If increased values in the magnitude, for example, at sampling point 22 and 23, initially suggest a possible structure, the exact spatial position, for example, the more exact position in the z-direction is then determined. For this purpose, a further image with a narrower grid of sampling points within a limited region around the coordinates of the supposed position of the structure can be prepared.

The exact position of a structure in the environment of the already identified sampling points 22, 23 can also be determined by interpolating between the sampling points. The spacing between the sampling points in this context is identical or close to the physical resolution of the imaging system comprising the antenna device 2 and the evaluation device 4. This is shown in the diagram 20. By interpolating between the sampling points 22 and 23, the exact position of the structure is obtained from the position of the maximum of the interpolated curve at the point 25 which results in the position $z_1$.

In the diagram 30, the phase of the reflected signal is shown via the co-ordinate z in the viewing direction towards the object under investigation. The diagram 30 shows two possible phase courses 26, 27. The dotted line curve 26 shows the phase of a signal $E_R$ which provides a sudden phase change at position $z_1$ of the structure. By contrast, the curve 27 shows a steady course at $z_1$ and accordingly, the reflected signal $E_R$ has not changed its phase in the reflection.

Since noise and varying material properties are present in a real system, only an approximate value is found, and the exact phase value 0 or respectively +/−180° is not found. In order to take this inaccuracy into account, a sudden phase change or a negative sign of the reflection coefficient is assumed when the determined phase value at the position of the structure is disposed in the region 31 and is therefore more than 90° or respectively less than −90°, and no sudden phase change and therefore a positive sign of the reflection coefficient is assumed when the determined phase value is disposed in the region 32, that is, provides a value less than 90° and more than −90°. The curve 27 here is obtained through the phase values present at the sampling points 22 and 23, and accordingly a sudden phase change is present at the $z_1$ position of the structure.

After the spatial position and phase behavior of the reflected signals have been determined, coherent regions with identical sign or respectively sequences of such coherent regions are identified, and a three-dimensional image of the determined phase behavior in the object 9 under investigation is prepared.

Figure 3:
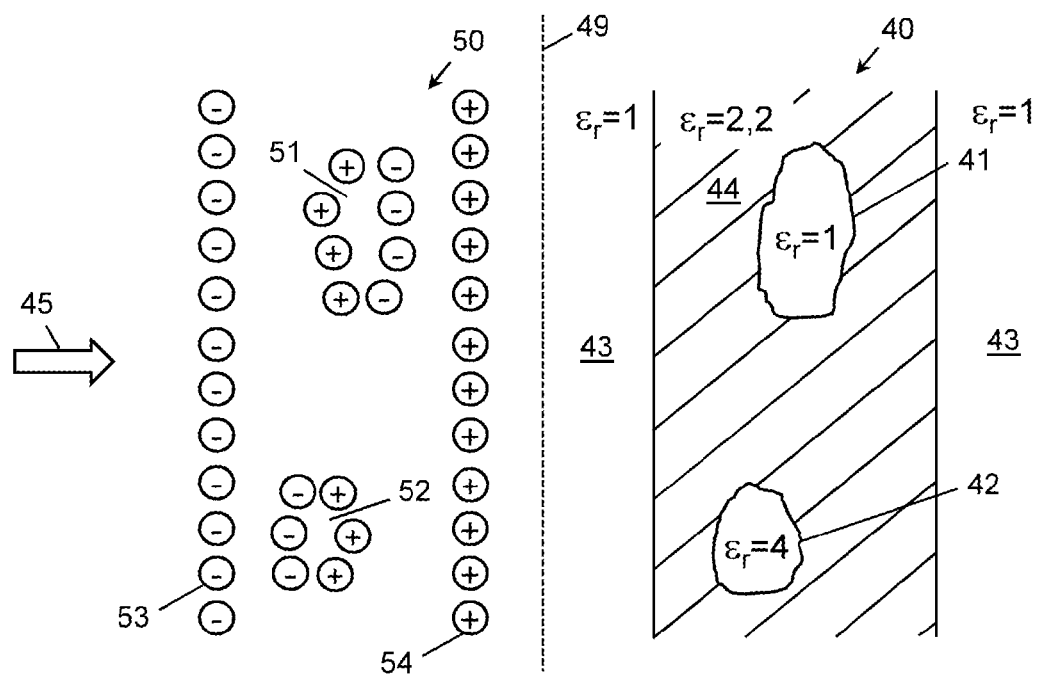
FIG. 3 a schematic view of a first object under investigation with an image prepared according to the method of the invention.

Such an image 50 is illustrated in FIG. 3 on the left of the dotted line 49. The object 40 under investigation is illustrated on the right of the line 49. The dielectric object 40 comprises primarily a material 44 with a permittivity of, for example, $\in_r=2.2$. It provides an inclusion 41 with a value of $\in_r=1$, which corresponds approximately, for example, to air or another gas. Another inclusion 42 provides the permittivity $\in_r=4$. The object 40 is surrounded, for example, by air 43 with a permittivity of $\in_r=1$. The first detected structure in the direction of incidence 45 of the signal is the limiting surface between the surrounding air 43 and the dielectric body 40. This relates to a transition to a material with a relatively higher permittivity, and the reflected signal correspondingly provides a sudden phase change. This is illustrated here by the corresponding negative sign of the reflection coefficient of the arrangement 53.

A part of the signal penetrates further into the object 40 under investigation and experiences a further partial reflection at the limiting surface to the inclusion 41. Since a transition from a material with relatively higher permittivity to a material with relatively lower permittivity is present here, no sudden phase change occurs, see the positive sign of the left-hand limit of the image of the inclusion 51. Another part of the signal is reflected with a sudden phase change on emerging from the inclusion 41 into the surrounding material 44 with a relatively higher permittivity, see the negative sign at the right-hand edge of the image of the inclusion 51. A part of the signal is now reflected without a sudden phase change at the limiting surface between the material 44 and the surrounding air 43 and shown in the image 50 by the values 54. The inclusion 41 in the image 50 is clearly recognizable through the arrangement 51 of positive and negative reflection coefficients.

Through this grouping of the phase behavior or respectively of the demonstration of the reflection coefficient, inclusions and their relative permittivity by comparison with the surrounding material can be determined. An inclusion 42 with a relatively higher permittivity than the surrounding material 44 of the object 40 under investigation results in the arrangement 52 in the image. In this context, an inclusion with relatively higher permittivity than the surrounding material is identifiable through the change from a negative reflection coefficient to a positive reflection coefficient.

Objects on a material such as water or metal with a high permittivity or high conductivity can be identified through the spatial determination of the phase behavior of the reflected signal. In this context in particular, it is possible to distinguish imaging artefacts caused by illumination boundaries from edges of the dielectric material. This distinction represents a problem with known imaging methods.

Figure 4:
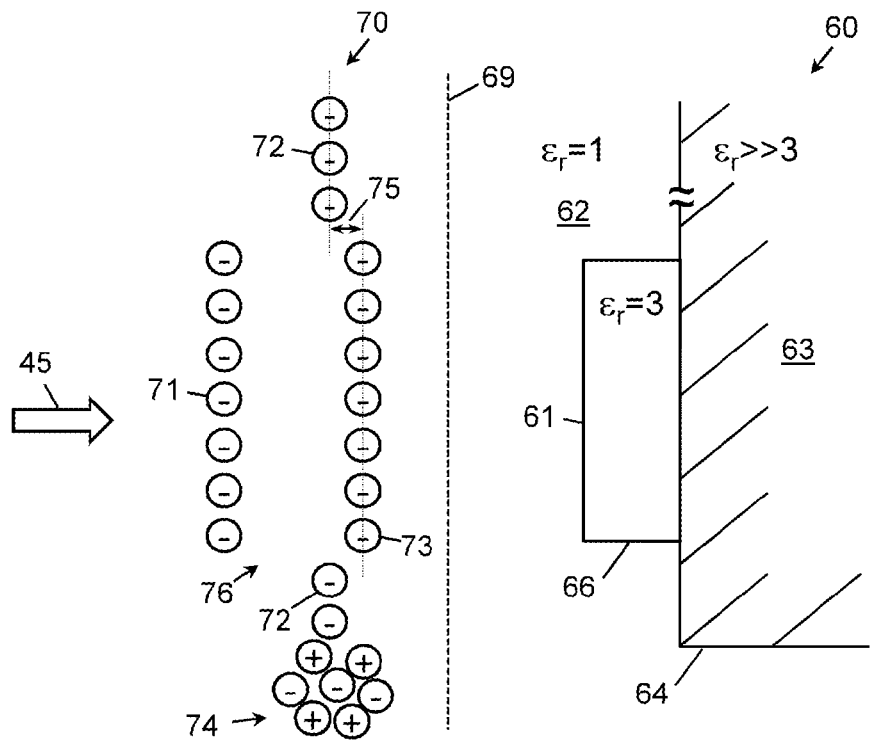
FIG. 4 a second object under investigation with a dielectric layer and edge, and an associated image according to the invention.

FIG. 4 shows such an arrangement. An object 60 with a very high permittivity, for example, $\in_r\gg3$ is illustrated on the right of the dotted line 69. This could be, for example, the skin of a human body. A dielectric body which provides a very much lower permittivity of, for example, $\in_r=3$ by comparison with the material 63 is arranged on it. Let this arrangement be surrounded, for example, by air or another dielectric 62 with a low permittivity, for example, of $\in_r=1$. In the viewing direction 45 towards the arrangement, the image 70 is obtained as illustrated on the left of the line 69. The material transition between the surrounding air 62 and the dielectric 61 is visualized through a grouping 71 of negative reflection coefficients. The limiting surface between the surrounding material 62 and the body 60 is imaged as a grouping 72 above and below the dielectric material 61.

The signals reflected at the limiting surface between the dielectric 61 and the material 60 form an arrangement 73 of negative signs of the reflection coefficient, because, here also, a transition to a material with a relatively higher permittivity is present. The arrangement 73 is shown with an offset 75 relative to the arrangement 72, because the delay time of the signal through the material 61 with higher permittivity is longer than through a material 62 with relatively lower permittivity.

If the signals strike an edge 64 of the material 63 with high permittivity or high conductivity, the signals are reflected with different phase behavior. This is evident in the image 70 through a region 74 with an irregular, chaotic sequence of positive and respectively negative reflection coefficients. By contrast, edges 66 on the dielectric body 61 show no such chaotic behavior, because the signal is reflected considerably less strongly from the dielectric material.

Figure 5:
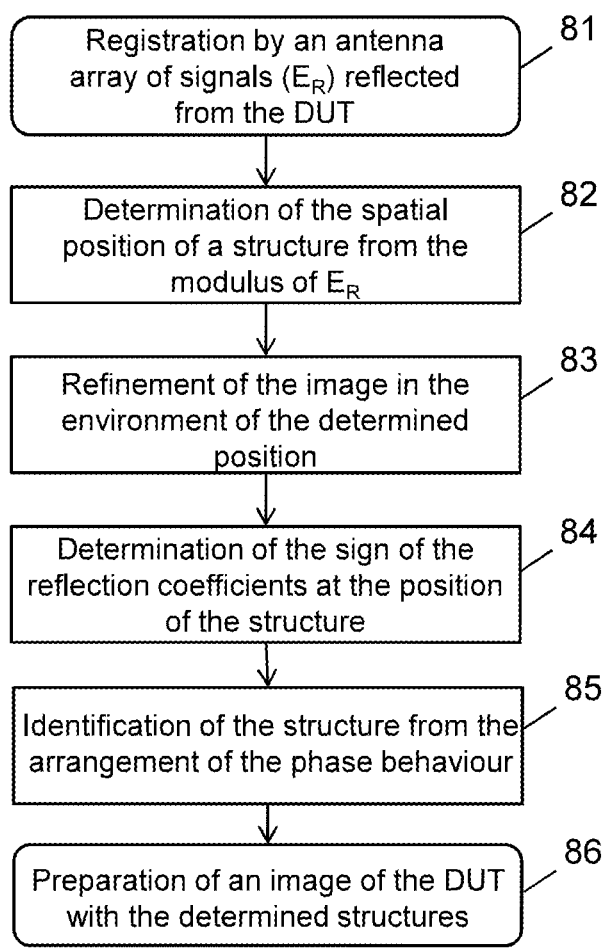
FIG. 5 a flow chart of an exemplary embodiment of the method according to the invention.

FIG. 5 shows the course of the method for determining structures such as material transitions or edges in a dielectric in the form of a flow diagram 80. In the first method step 81, the signals ($E_R$) reflected from the object under investigation are registered by an antenna array. With the three-dimensional focusing the named synthetic or also a physical focusing method, the sampling points with an increased magnitude of the reflected signal are now determined. In method step 83, the resolution in the environment of a structure is refined, and in method step 84, the phase behavior of the signal reflected there is determined. The type of structure and also information about the permittivity of the structure can be determined from the arrangement of the phase behavior, illustrated, for example, through the sign of the reflection coefficient, see 85. In method step 86, an image of the object 9 under investigation and the determined structures 10 is prepared.

Such an image can be used, for example for material investigation of dielectrics. However, the method can also be used, for example, in the case of body scanners in order to visualize dielectric materials by contrast with the body. In this context, especially poorly illuminated or non-illuminated regions of edges of a dielectric can be distinguished.

All of the features described and/or illustrated can be advantageously combined with one another within the framework of the invention. The invention is not restricted to the exemplary embodiments described.

The invention claimed is:

1. A method for detecting structures, especially edges and material transitions on and/or in an object under investigation, comprising:
    providing an antenna arrangement from which microwave signals are transmitted and from which the signals reflected from the object under investigation are registered in magnitude and phase, wherein a three-dimensional image of the object under investigation is reconstructed from these:
    determining a spatial position of a structure from the magnitude of the reflected signal, determining the sign of the reflection coefficient of the reflected signal at the spatial position of the structure, and identifying structures on the basis of the spatial arrangement of the sign of the reflection coefficient, wherein an illumination boundary of the object under investigation and/or an edge in a material are determined if an irregular sequence of sign changes is detected within a spatial region.

2. The method according to claim 1, wherein the precise spatial position of the structure is determined by preparing an image in the region of the originally determined spatial position with a narrower grid of sampling points.

3. The method according to claim 1, wherein the precise spatial position of the structure is determined by interpolation of the signal magnitude between sampling points in the region of the originally determined spatial position.

4. The method according to claim 1, wherein the sign of the reflection coefficient is determined from the phase behavior of the reflected signal, and wherein a negative sign of the reflection coefficient is present if a sudden phase change is determined in the reflected signal, and a positive sign of the reflection coefficient is present if a steady course of the phase of the reflected signal is determined.

5. The method according to claim 4, wherein a sudden phase change is detected if the phase of the reflected signal at the position of the structure is less than $-90°$ or more than $+90°$, and wherein a steady course of the phase is detected if the phase of the reflected signal at the position of the structure is less than $+90°$ and more than $-90°$.

6. The method according to claim 1, wherein the spatial extension and the spatial shape of a limiting surface of a material transition are identified through coherent regions with identical phase behavior.

7. The method according to claim 1, wherein an inclusion made from a material with a permittivity which differs from the permittivity of the surrounding object under investigation is determined if, within the object under investigation, a coherent region with a negative sign follows an adjacent coherent region with a positive sign or vice versa.

8. The method according to claim 7, wherein the inclusion comprises a material with a relatively higher permittivity than the material of the surrounding object under investigation if a coherent region with a negative sign is initially detected, and following this, a coherent region with a positive sign is detected, and the inclusion provides a material with a relatively lower permittivity than the material of the surrounding object under investigation if a coherent region with a positive sign is initially detected, and following this, a coherent region with negative sign is detected.

9. The method according to claim 1, wherein the material has high permittivity and/or conductivity.

10. A device for detecting structures, especially edges and material transitions on and/or in an object under investigation, comprising:

an antenna arrangement which provides a plurality of transmission and reception antennas, wherein each transmission antenna transmits microwave signals in succession, and all of the reception antennas register the signals reflected from the object under investigation in magnitude and phase, and an evaluation unit, which provides an imaging unit which reconstructs a three-dimensional image of the object under investigation from the registered, reflected signals, wherein the evaluation unit further provides:
a localization unit which determines a spatial position of a structure from the magnitude of the reflected signal,
a phase unit which determines the sign of the reflection coefficient of the reflected signal at the spatial position of the structure, and
a grouping unit which identifies the structure on the basis of the spatial arrangement of the sign of the reflection coefficient,
wherein the grouping unit determines an illumination boundary of the object under investigation and/or an edge in a material if an irregular sequence of sign changes is detected within a spatial region.

11. The device according to claim 10, wherein the localization unit determines the precise spatial position of the structure by interpolation of the signal magnitude between sampling points and/or by preparing a further image in the region of the originally determined spatial position with a narrower grid of sampling points.

12. The device according to claim 10, wherein the phase unit determines the sign of the reflection coefficient from the phase behavior of the reflected signal,
wherein a negative sign of the reflection coefficient is present if it determines a sudden phase change in the reflected signal, and
wherein a positive sign of the reflection coefficient is present if it determines a steady course of the phase of the reflected signal.

13. The device according to claim 12, wherein the phase unit detects a sudden phase change if the phase of the reflected signal at the position of the structure is less than $-90°$ or more than $+90°$, and detects a steady course of the phase if the phase of the reflected signal at the position of the structure is less than $+90°$ and more than $-90°$.

14. The device according to claim 10, wherein the grouping unit identifies a spatial extension and a spatial shape of a limiting surface of a material transition with reference to coherent regions with identical phase behavior.

15. The device according to claim 10, wherein the grouping unit determines an inclusion made from a material with a permittivity which differs from the permittivity of the surrounding object under investigation if a coherent region with a negative sign follows an adjacent coherent region with a positive sign within the object under investigation or vice versa.

16. The device according to claim 10, wherein the grouping unit detects an inclusion made from a material with a higher permittivity than the material of the object under investigation if a region with a negative sign is initially detected, and following this, a region with a positive sign is detected within the object under investigation or that it detects an inclusion made from a material with a relatively lower permittivity than the material of the object under investigation if a region with positive sign is initially detected, and following this, a region with negative sign is detected.

17. The device according to claim 10, wherein the material has high permittivity and/or conductivity.

18. The device according to claim 10, wherein the imaging unit displays the determined spatial structures and/or the permittivity of the determined structures.

19. A computer program with program-code means which executes the method steps of claim 1 when the program is executed on a programmable computer and/or a digital signal processor.

20. A computer-readable storage medium with program-code means stored upon it which executes the method steps of claim 1 when the program is executed on a programmable computer and/or a digital signal processor.

* * * * *